(12) United States Patent
Cai et al.

(10) Patent No.: US 9,654,928 B2
(45) Date of Patent: *May 16, 2017

(54) TRACKING INFORMATION TECHNOLOGY (IT) ASSETS

(71) Applicant: International Business Machines Corporation, Armonk, NY (US)

(72) Inventors: Mingming Cai, Mishawaka, IN (US); Yubo Li, Beijing (CN); Qing Wang, Beijing (CN); Chao Xue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,661

(22) Filed: Jun. 10, 2016

(65) Prior Publication Data
US 2017/0086025 A1 Mar. 23, 2017

Related U.S. Application Data

(63) Continuation of application No. 15/052,237, filed on Feb. 24, 2016, which is a continuation of application No. 14/861,112, filed on Sep. 22, 2015.

(51) Int. Cl.
*H04W 64/00* (2009.01)
*H04W 4/02* (2009.01)
(Continued)

(52) U.S. Cl.
CPC .......... *H04W 4/023* (2013.01); *H04B 17/318* (2015.01); *H04W 4/008* (2013.01); *H04W 4/06* (2013.01); *H04W 52/0216* (2013.01)

(58) Field of Classification Search
CPC ... H04W 64/00; H04W 64/003; H04W 4/008; G06K 2017/0045; G06Q 20/203; G08B 13/2462; G08B 21/0277
See application file for complete search history.

(56) References Cited

U.S. PATENT DOCUMENTS 5,640,151 A * 6/1997 Reis .................. G01S 13/74
340/10.2
RE40,073 E 2/2008 Breed
(Continued)

FOREIGN PATENT DOCUMENTS

| WO | 2009001353 A2 | 12/2008 |
| WO | 2014030134 A1 | 2/2014 |
| WO | 2014068366 A1 | 5/2014 |

OTHER PUBLICATIONS

IBM, List of IBM Patents or Patent Applications Treated as Related, Appendix P, dated Aug. 24, 2016, 2 pages.
(Continued)

*Primary Examiner* — Andrew Bee
(74) *Attorney, Agent, or Firm* — Erik K. Johnson

(57) ABSTRACT

An association connection is established between a first Bluetooth Low Energy (BLE) device operating in central mode and attached to an asset to track, and a second BLE device operating in peripheral mode and associated with a physical location within the asset management environment. An association connection is established between the second BLE device and a third BLE device operating in central mode and coupled to one or more computer processors, and the association information stored in the second BLE device to the third BLE via one or more broadcasting frames is periodically transmitted. Based on current association information between the first BLE device and the second BLE device, an identity of the asset to which the first BLE device is attached, and the physical location of the second BLE device within the asset management environment is identified.

1 Claim, 8 Drawing Sheets

(51) Int. Cl.
*H04B 17/318* (2015.01)
*H04W 4/06* (2009.01)
*H04W 4/00* (2009.01)
*H04W 52/02* (2009.01)

(56) References Cited

U.S. PATENT DOCUMENTS

| | | | |
|---|---|---|---|
| 2009/0219170 A1* | 9/2009 | Clark | G01S 5/02 340/8.1 |
| 2014/0187261 A1 | 7/2014 | Lee et al. | |
| 2014/0191868 A1 | 7/2014 | Ortiz et al. | |
| 2016/0014118 A1 | 1/2016 | Da et al. | |
| 2016/0026837 A1 | 1/2016 | Good et al. | |
| 2016/0080486 A1* | 3/2016 | Ram | H04L 51/046 709/205 |

OTHER PUBLICATIONS

Pending U.S. Appl. No. 15/052,327, filed Feb. 24, 2016, Entitled: "Tracking Information Technology (IT) Assets".

Pending U.S. Appl. No. 14/861,112, filed Sep. 22, 2015, Entitled: "Tracking Information Technology (IT) Assets".

Ionescu et al., "Improving Distance Estimation in Object Localisation with Bluetooth Low Energy", Institute of Services Science, University of Geneva, Switzerland, The Eighth International Conference on Sensor Technologies and Applications, SENSORCOMM 2014, Nov. 16-20, 2014, Lisbon, Portugal, pp. 1-5, <http://tam.unige.ch/assets/documents/publications/SENSORCOMM2014_Ionescu.pdf>.

Keating, Joe, "BLE and energy harvesting enable low-cost, maintenance-free active RFID systems", Thu, May 24, 2012, Infinite Power Solutions, Inc., www.infinitepowersolutions.com, pp. 1-6, <http://www.ecnmag.com/articles/2012/05/ble-and-energy-harvesting-enable-low-cost-maintenance-free-active-rfid-systems>.

Barcode Media Group, Inc., "Fixed Asset Tracking With Bluetooth Low Energy Technology", The Bar Code News™, pp. 1-2, © 2010-2015 Barcode Media Group, Inc., Sarasota FL, All rights reserved, <http://barcode.com/201402112144/leader-in-bluetooth-low-energy-technology-introduces-new-beacon-solution.html>.

Mell et al., "The NIST Definition of Cloud Computing," National Institute of Standards and Technology, U.S. Department of Commerce, NIST Special Publication 800-145, Sep. 2011, pp. 1-7.

\* cited by examiner

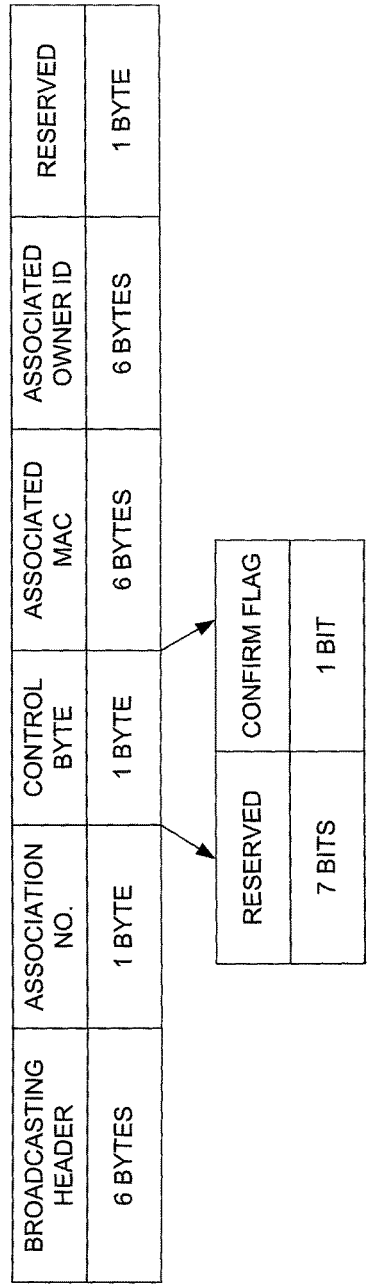

TRACKING INFORMATION TECHNOLOGY (IT) ASSETS

BACKGROUND OF THE INVENTION

The present invention relates generally to the field of asset management, and more particularly to tracking location information for assets with high accuracy and low latency in a computing environment.

Information technology (IT) assets, such as, servers, monitors, laptops, telephones, and other electronic devices often require asset management. For example, in an enterprise computing environment where a collection of hundreds or thousands of IT assets are in use, such as a server farm or a server cluster, an administrative user of the server farm may require location information for each of the hundreds or thousands of IT assets. Furthermore, each of the hundreds or thousands of IT assets may change locations across long or short distances. For example, a server that is a part of the server farm could move from one server rack to another (i.e., a long distance) or within a single server rack (i.e., a short distance).

SUMMARY

Embodiments of the present invention disclose a computer program product for management of assets in an asset management environment. An association request is transmitted by a first (Bluetooth Low Energy) BLE device to the second BLE device to establish an association connection between the first BLE device operating in central mode and attached to an asset to track, and the second BLE device operating in peripheral mode and associated with a physical location within an asset management environment, wherein the asset to which the first BLE device is attached is an electronic device including one of: a display monitor, a personal digital assistant (PDA), a mobile cellular device, computing peripheral equipment, another specialized computer system or a computer server, responsive to determining that a received signal strength indicator (RSSI) indicates that a signal power between the first BLE device and a second BLE device exceeds a predefined threshold, transmitting, by the first BLE device. One or more association request frames are exchanged whereby association information is stored in the second BLE device. An association connection is established between the second BLE device and a third BLE device operating in central mode and coupled to one or more computer processors, and periodically transmitting the association information stored in the second BLE device to the third BLE device via one or more broadcasting frames. Current association information between the first BLE device and the second BLE device is maintained, based on the transmitted association information. The current association information between the first BLE device and the second BLE device is received. Location information is identified of the asset to which the first BLE device is attached based on the current association information between the first BLE device and the second BLE device, an identity of the asset to which the first BLE device is attached, and the physical location of the second BLE device within the asset management environment, wherein the location information of the asset to which the first BLE device is attached describes one or more locations of the asset in asset management environment throughout a duration of time. The association information is updated by the second BLE device to indicate that the first BLE device is not associated with the second BLE device, responsive to determining that an RSSI does not exceed a predefined threshold. The first BLE device is dissociated from the second BLE device, wherein the timer time-out condition for the association request frame is implemented to periodically confirm that association connection is currently established, responsive to determining that the association request frame was not received before a timer time-out condition.

BRIEF DESCRIPTION OF THE DRAWINGS

FIG. 5 is a diagram of an association request (AR) frame, in accordance with another embodiment of the present invention;

FIG. 6 is a diagram of a broadcasting (BC) frame, in accordance with another embodiment of the present invention;

FIG. 7 is a diagram of an association updated acknowledgement (AUA) frame, in accordance with an embodiment of the present invention;

DETAILED DESCRIPTION

Embodiments of the present invention provide systems, methods, and computer program products for tracking location information of moveable assets, such as information technology (IT) assets. In an exemplary embodiment of the invention, the asset tracking system is based on a network of wireless Bluetooth Low Energy (BLE) devices. BLE devices operate in two modes. In peripheral mode, a BLE device periodically broadcasts an identifying signal, and can receive and accept an association request. In central mode, a BLE device can transmit association requests and establish data connections to other BLE devices in peripheral mode, and scan, or receive, broadcast signals from BLE devices operating in peripheral mode. A typical range for BLE devices is about 30-50 m, however theoretical limits extend beyond this range, and a BLE device may be adjusted to lower ranges.

In the exemplary embodiment, BLE devices operating in central mode are attached to assets to monitor, for example, each server in a server rack. These BLE devices are referred to as activators. A BLE device operating in peripheral mode is, for example, attached to each server rack. These BLE devices are referred to as monitors. A final BLE device operating in central mode is situated within range of the monitors, and is coupled to an asset management application. Generally, each activator, for example, each activator attached to the servers in a rack, scans for broadcast signals from monitors, and associates with the monitor having the highest signal strength, for example, the monitor attached to the rack containing the servers. Periodically, the monitors broadcast data frames that contain information identifying the activators to which they have associated. Periodically, the collector scans for broadcasts from all monitors within range, and collects each monitor's association information. On request, the collector uploads this information to an asset management application. If an asset with an activator is moved, for example a server is moved to another server rack, the activator will associate with the monitor in the new server rack, and this information will be broadcast by the monitor, scanned by the collector, and uploaded to the asset management application. In this manner, movement of assets within the range of the collector can be monitored by the asset management application.

Figure 1:
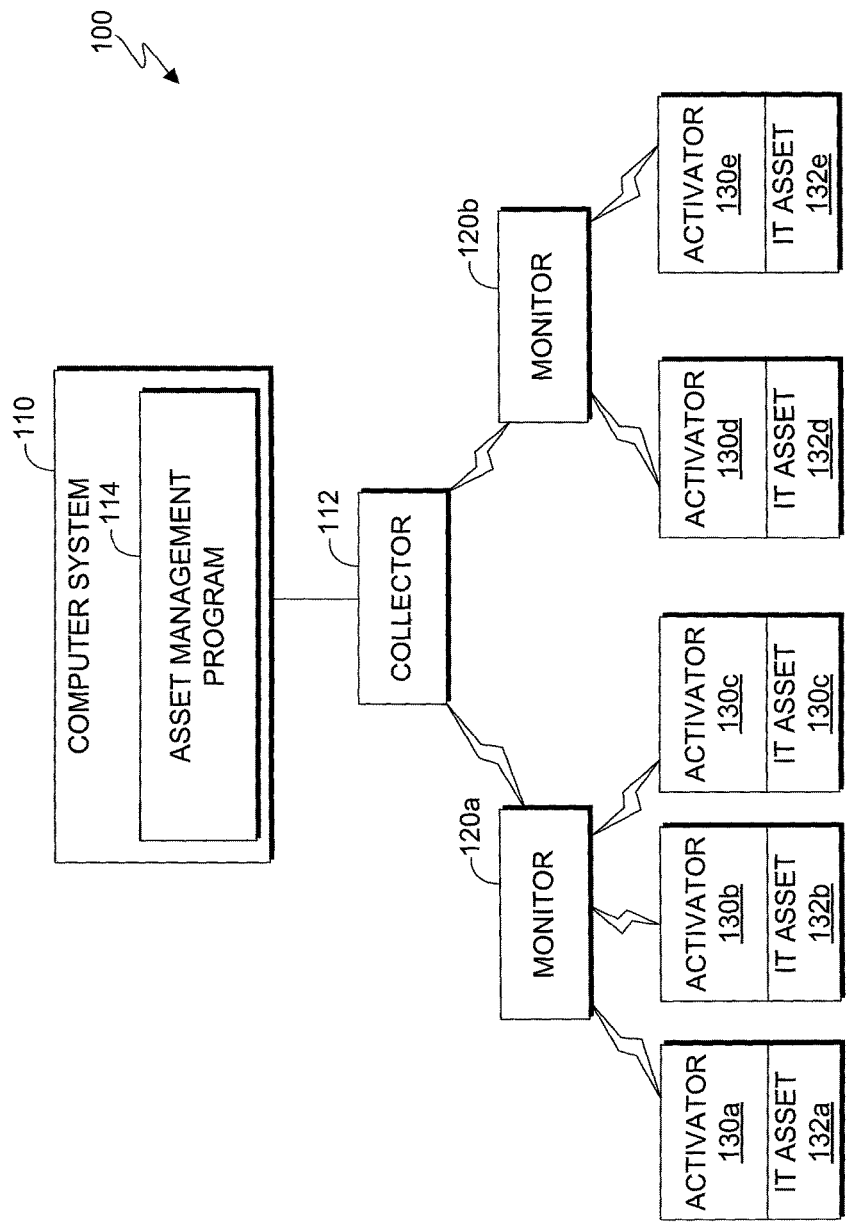
FIG. 1 is a block diagram of components in an asset management environment, in accordance with an embodiment of the present invention.

FIG. 1 is a functional block diagram of asset management environment 100, in accordance with an embodiment of the present invention. Asset management environment 100 includes computer system 110, collector 112, monitors 120a-b, activators 130a-e, and IT assets 132a-e.

IT assets 132 represent physical assets in an IT environment for which there is a tracking requirement, for example, for inventory purposes. In one embodiment, each of IT assets 132 may be an electronic device, such as a computer system, a display monitor, a personal digital assistant (PDA), mobile cellular device, computing peripheral equipment (e.g., mouse), specialized computer server, etc.

Activators 130 represent Bluetooth Low Energy (BLE) devices operating in a central BLE mode, such that association requests (i.e., one or more requests configured to establish an association connection between two BLE devices) can be transmitted, and association connections can be established. In one embodiment, each of IT assets 132 is coupled (i.e., attached) with one of activators 130. Furthermore, activators 130 may help manage and track location information of IT assets 132 through a data packet, or frame. For example, activators 130 may transmit an association request frame (i.e., AR Frame), as described in greater detail with regard to FIG. 6. Activators 130 may also periodically resubmit an association request to a BLE device to which the activator 130 has an established association connection, as described in greater detail with regard to FIG. 4.

Asset management environment 100 can manage and track location information of IT assets 132. The phrase, "location information," as used herein, refers to information describing one or more locations of one or more IT assets 132 disposed in asset management environment 100 throughout a duration of time. In yet another embodiment, one or more IT assets 132 may include BLE capabilities. In this embodiment, the BLE capability of these one or more IT assets 132 may be configured to operate in a manner similar to that of activators 130, as described in greater detail later in this specification. It should be understood, that BLE devices as described herein utilize radio tele-communicative signals, and each BLE device can determine the of power, for example received signal strength indicator (RSSI), of signals received from other BLE devices.

Each of monitors 120 represents a BLE device operating in a peripheral BLE mode. In one embodiment, each of monitors 120 may associate with one or more of activators 130. Monitors 120 may periodically broadcast association information via a broadcasting frame (i.e., BC Frame), as described in greater detail with regard to FIG. 6. The phrase, "association information," as used herein, refers to information that is typically transmitted via a frame describing one or more established association connections between two BLE devices (e.g., activators 130, monitors 120, etc.). In another embodiment, monitors 120 may implement one or more timers (i.e., a watchdog timer) to monitor for an association request resubmitted by one of activators 130, as described in greater detail with regard to FIG. 4, to confirm that an activator 130 is still within range and associated with the monitor 120.

Collector 112 represents a BLE device operating in a central BLE mode, such that an association connection can be established between monitors 120 and collector 112. In one embodiment, collector 112 receives information from monitors 120 identifying the associations currently established with between the monitor 120 and activators 130. Furthermore, collector 112 may transmit an association request and establish an association connection between monitors 120. Accordingly, a successfully established association connection between monitors 120 and collector 112 enables collector 112 to receive association information that is broadcasted from each of the one or more monitors 120 (e.g., a BC Frame) and subsequently, collector 112 can update an updated acknowledgment frame (i.e., AUA Frame), as described in greater detail with regard to FIG. 7.

Computer system 110 represents a platform that hosts an asset management function for tracking and managing inventory and location information for assets 132, to which activators 130 are physically attached. Computer system 110 includes asset management program 114. Computer system 110 may communicate with collector 112, for example, via a wired or wireless network or through a gateway device. Computer system 110 can be a desktop computer, laptop computer, specialized computer server, or another computer system, in accordance with embodiments of the invention. In certain embodiments, computer system 110 represents one or more computer systems utilizing clustered computers and components to act as a single pool of seamless resources. In general, computer system 110 is representative of any electronic device, or combination of electronic devices, capable of executing machine-readable program instructions in accordance with one or more embodiments of the invention, as described in greater detail with regard to FIG. 8, below. In other embodiments, computer system 110 may be implemented in a cloud computing environment, as described in relation to FIGS. 9 and 10 below.

Asset management program 114 represents one or more programs to analyze association information to track location information for IT assets 132 disposed in asset management environment 100. For example, asset management program 114 may store a record of each physical location for each of monitors 120 that are disposed in asset management environment 100. In this example, asset management program 114 receives association information from collector 112 describing association statuses between activators 130 and monitors 120. Accordingly, the received association information can be analyzed to determine a proximal location (i.e., location information) of each of IT assets 132 which are attached to one of activators 130, based on the stored record of each physical location for each of monitors 120.

It should be understood, that asset management environment 100 may include a greater or lesser number of components to track and manage location information of IT assets 132. For example, asset management environment 100 can be a server cluster or a server farm that may include hundreds of IT assets 132 attached to hundreds of activators 130 disposed on a number of server racks. In these instances, one or more monitors 120 may be disposed on each of the server racks and broadcast to collector 112 association information that identifies each of activators 130 having an established association connection with the one or more monitors 120. Accordingly, asset management program 114 can track location information of IT assets 132 based on the association information that is collected in asset management environment 100 along with information (e.g., a map, graph, etc.) that identifies physical locations of each of the hundreds of monitors 120 disposed on each server rack.

In an exemplary embodiment, as illustrated in FIG. 1, five IT computer servers (e.g., IT assets 132) are disposed in two locations. IT assets 132a-c are disposed in a first location (e.g., a first server rack) and IT assets 132d-e are disposed in a second location (e.g., a second server rack). The first location of asset management environment 100 includes monitor 120a. At the first location, activator 130a is physically attached to IT asset 132a, activator 130b is physically attached to IT asset 132b, and activator 130c is physically attached to IT asset 132c. Activators 130a-c establish association connections with monitor 120a, and monitor 120a establishes an association connection with collector 112, such that location information of IT assets 132a-c can be tracked and managed via the association information between monitor 120a and activators 130a-c. After associating, monitor 120a periodically reconnects with each of activators 130a-c to confirm that each of activators 130a-c are still within range (i.e., meets an RSSI threshold). If one of activators 130a-c fails to reconnect, for example, it has moved out of range, monitor 120 updates its association information and broadcasts the updated association information to collector 112.

The second location of asset management environment 100 includes monitor 120b. At the second location, activator 130d is physically attached to IT asset 132d and activator 130e is physically attached to IT asset 132e. Activators 130d-e have established association connections with monitor 120b, and monitor 120b has established an association connection with collector 112, such that location information of IT assets 132c-e can be tracked and managed via the association information between monitor 120b and activators 130d-e. If after associating, monitor 120b periodically reconnects with each of activators 130d-e to confirm that each of activators 130d-e are still within range (i.e., meet an RSSI threshold). If one of activator 130d-e fails to reconnect, for example, it has moved out of range, monitor 120b updates association information and broadcasts the updated association information to collector 112. Accordingly, asset management program 114 analyzes the updated association information to identify one or more movements of IT assets 132 within and outside of asset management environment 100.

Collector 112 is configured to scan for, send association requests to, and receive broadcasted signals from monitors 120a-b. For example, collector 112 may have an upper range of a 30 meter-50 meter radius for establishing an association connection with monitors 120a-b.

Activator 130a and monitor 120a may have a greater RSSI compared to an RSSI for activator 130c and monitor 120a, because activator 130a may be in closer proximity to monitor 120a compared to activator 130c. In one example, monitor 120b may determine that the RSSI between monitor 120a and activator 130a, and the RSSI between monitor 120b and activator 130a may exceed a specified threshold. In this instance, activator 130a may establish an association connection with monitor 120a or monitor 120b and, based on which monitor 120 has the greatest RSSI (i.e., closest proximity).

Figure 2:
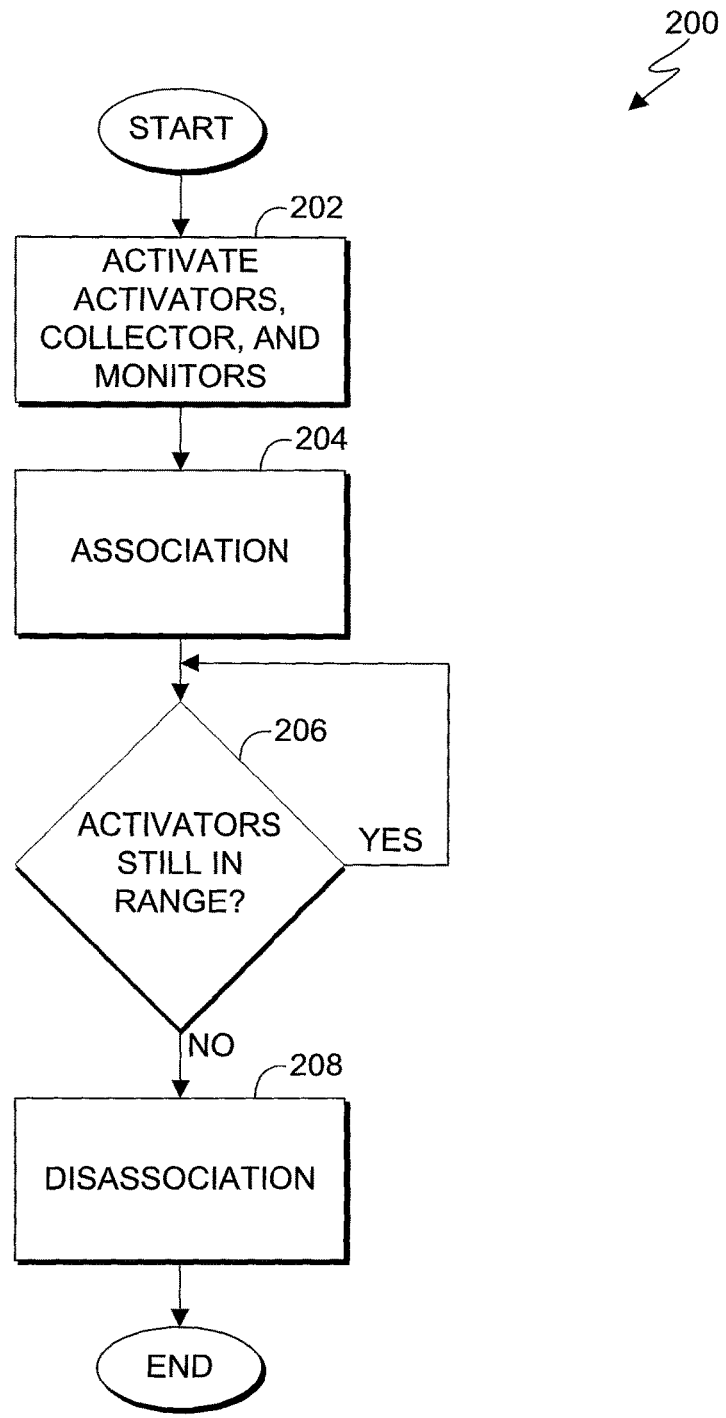
FIG. 2 is a flowchart illustrating operational steps of a first aspect of an asset management environment, in accordance with an embodiment of the present invention.

FIG. 2 is a flowchart 200 illustrating operational steps for a first aspect of asset management environment 100, in accordance with an embodiment of the present invention.

In step 202, activators 130, collector 112, and monitors 120, are activated such that activators 130 and collector 112 operate in a BLE central mode, and monitors 120 operate in a BLE peripheral mode.

In step 204, collector 112 receives association information from monitors 120. For example, the association information may include an association status indicating whether the activator 130a has an established association connection with monitor 120a. In one embodiment, activator 130a is associated with monitor 120a based, at least in part on, a threshold (i.e., a RSSI signal strength), as described in greater detail with regard to FIG. 3.

In decision 206, monitors 120 determine whether activators 130 are still within range by resubmitting association requests. In one embodiment, activator 130a and monitor 120a may have established an association connection at a first time. At a second time, activator 130a may resubmit an association request to confirm that the association connection established at the first time is still established at the second time. Furthermore, monitor 120a may implement a timer for resubmitting association requests, as described in greater detail with regard to FIG. 4. If in decision 206, activators 130 respond to the resubmitted association requests, the association is maintained.

If in decision 206, an activator 130 does not respond to a resubmitted association request, for example, because the activator 130 has moved out of range of the monitor 120, the monitor 120 dissociates with the activator 130. Monitor 120 updates its association information to remove the dissociated activator 130.

Figure 3:
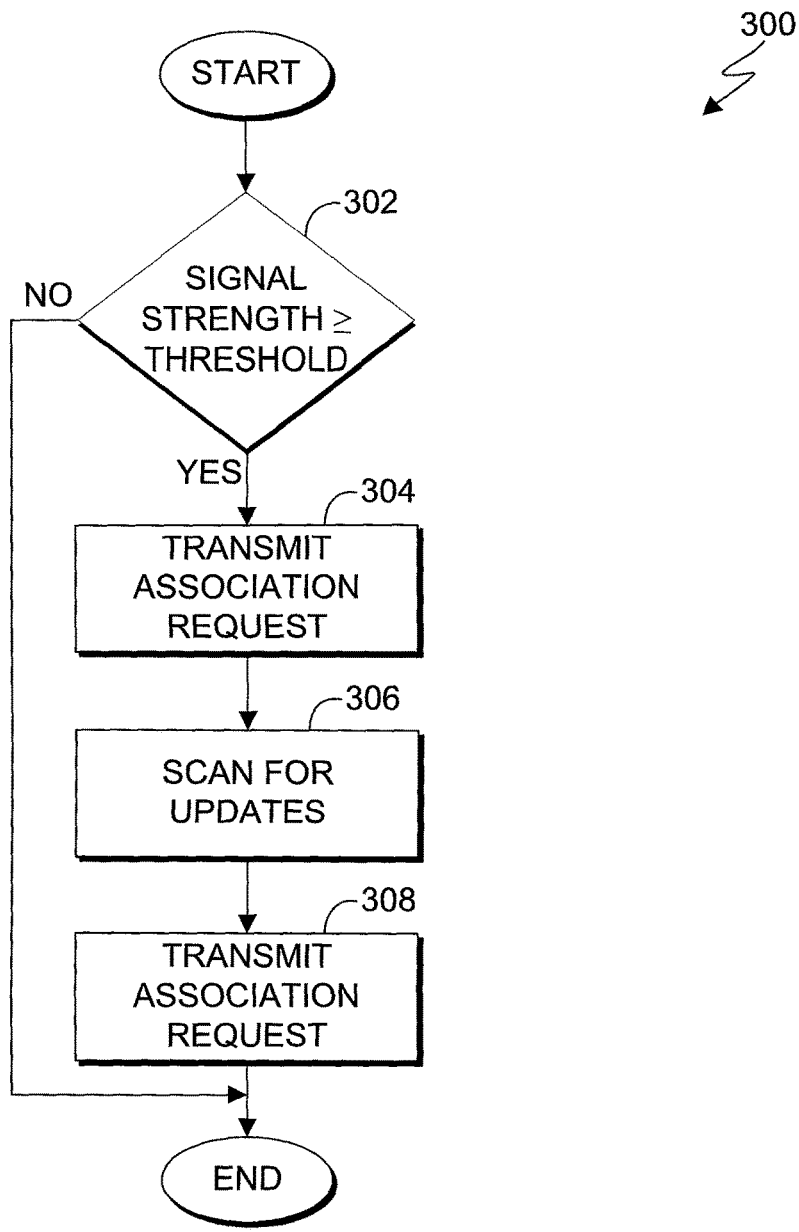
FIG. 3 is a flowchart illustrating operational steps of a second aspect of an asset management environment, in accordance with another embodiment of the present invention.

FIG. 3 is a flowchart 300 illustrating operational steps for a second aspect of asset management environment 100, in accordance with another embodiment of the present invention. In one embodiment, prior to performing operational steps described herein, one or more monitors 120 may broadcast a BC Frame, described below, to collector 112, such that collector 112 can update association information and identify one or more activators 130 associated with one or more monitors 120.

In decision 302, an activator 130 determines whether a signal strength between the activator 130 and a monitor 120 meets or exceeds a specified threshold. In one embodiment, the activator 130 may periodically analyze the monitor 120 RSSI, subsequent to establishing an association connection between the activator 130 and monitor 120, as described in greater detail with regard to FIG. 4. The activator 130 may determine a monitor 120 having a signal strength that meets or exceeds the specified threshold by sequentially analyzing a signal strength for each of monitors 120 within a range. For example, in asset management environment 100, activator 130a may analyze whether a signal strength between activator 130a and monitor 120a meets or exceeds a specified threshold at a first time. Then, at a second time, activator 130a may analyze whether a signal strength between activator 130a and monitor 120b meets or exceeds a specified threshold. In certain embodiments, an activator 130 may determine that more than one monitors 120 meet or exceed a specified threshold. In these instances, the activator 130 may identify a monitor 120 having the highest RSSI to associate with, as described later in this specification.

If in decision 302, the activator 130 determines that a signal strength between the activator 130 and a monitor 120 meets or exceeds a specified threshold, then in step 304, the activator 130 transmits an association request to the monitor 120. In one embodiment, an AR Frame, described below, is transmitted to the monitor 120 by the activator 130. In certain embodiments, the monitor 120 may reject the association request if the activator 130 already has an association connection with another monitor 120. In general, the monitor 120 updates the BC Frame with information based, at least in part on, whether the monitor 120 accepted the association request from the activator 130.

For example, in asset management environment 100, activator 130b may send an association request to monitor 120a, responsive to activator 130b determining that the RSSI for monitor 120a meets or exceeds a specified threshold. Furthermore, activator 130b may also transmit an AR Frame to monitor 120a, and monitor 120a may update a BC Frame, indicating that monitor 120a accepted the association request from activator 130b, and broadcast the updated BC Frame to collector 112.

In step 306, collector 112 scans the BC Frame for updates which may indicate a successful association connection between the first of activators 130 and the first of associated monitors 120. In one embodiment, collector 112 received the updated BC Frame from the first of associated monitors 120. For example, in asset management environment 100, collector 112 may scan the updated BC Frame broadcasted by monitor 120b.

In step 308, collector 112 transmits an association request to the monitor 120 to transmit an Association Updated Acknowledgement Frame (AUA Frame) that confirms one or more updates analyzed from the BC Frame. Accordingly, collector 112 acknowledges that the first of the one or more activators 130 established an association connection (i.e., data connectivity) with the first of monitors 120.

Figure 4:
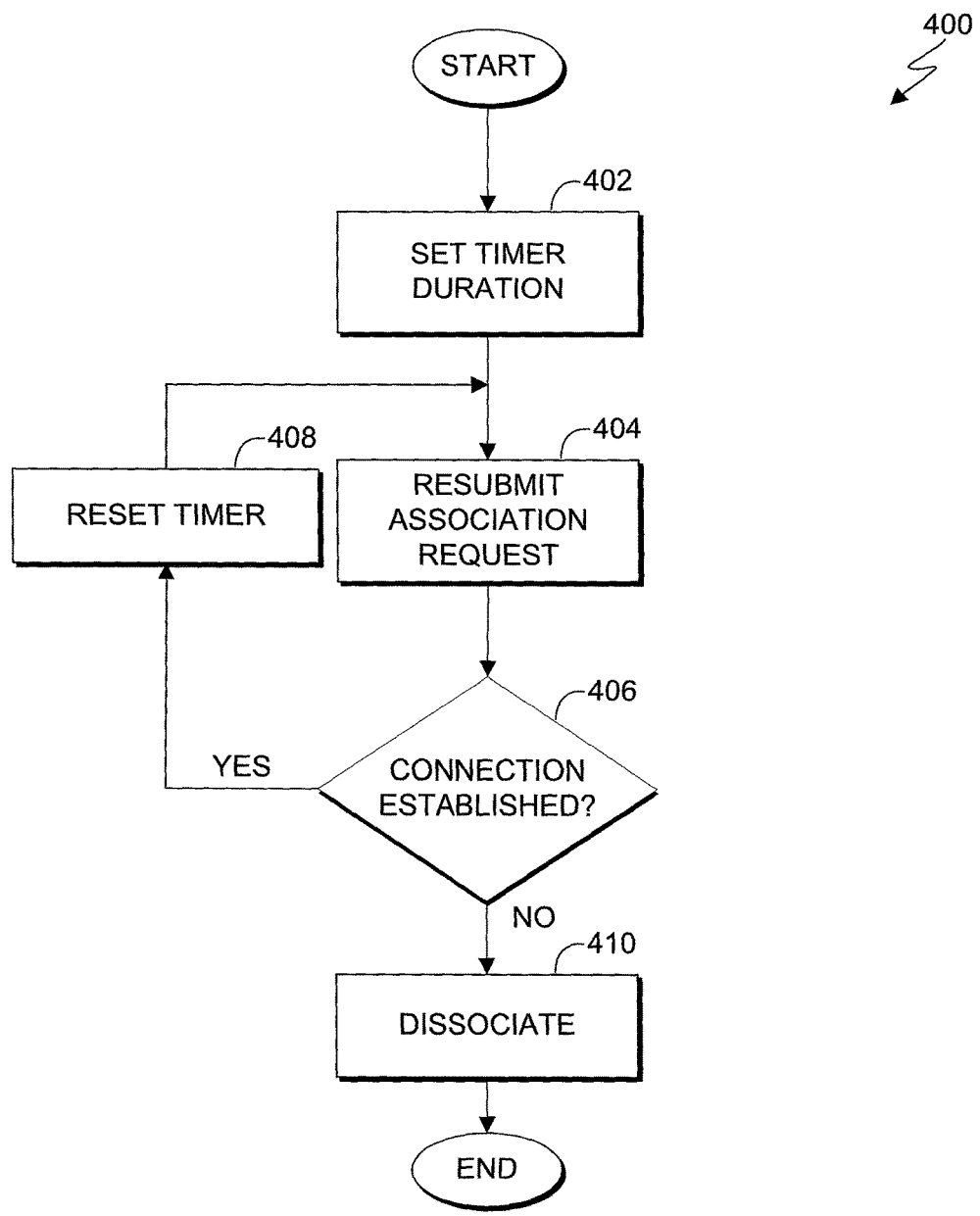
FIG. 4 is a flowchart illustrating operational steps of a third aspect of an asset management environment, in accordance with an embodiment of the present invention.

FIG. 4 is a flowchart 400 illustrating operational steps for a third aspect of asset management environment 100, in accordance with an embodiment of the present invention. It should be understood that, an activator 130 is associated with a monitor 120, as described in FIG. 3, prior to performing operational steps described herein.

In step 402, associated monitors 120 set a duration for a timer. In one embodiment, associated monitors 120 initialize, or set the timer to zero, the timer. The timer is implemented to ensure that each associated monitor 120 periodically confirms its established association connections with an actuator. The timer may be controlled by an administrative user of asset management environment 100. For example, the administrative user may set the timer duration to sixty seconds.

In step 404, an activator 130 resubmits an association request to a first of associated monitors. For example, in asset management environment 100, activator 130b may be successfully associated with monitor 120a by implementing operational steps as described in FIG. 3. In this instance, activator 130b may resubmit an association request to monitor 120a to confirm whether an association connection is successfully established.

In decision 406, the first of activators 130 determines whether an association connection between the first of activators 130 and the first of associated monitors 120 has been established. In one embodiment, an established association connection between the first of activators 130 and the first of associated monitors 120 enables continued data connectivity between the first of the one or more activators 130 and the first of the one or more associated monitors 120. Furthermore, an established association connection may be determined by the first of activators 130, by analyzing a signal strength between the first of activators 130 and the first of associated monitors 120.

If in decision 406 the first of activators 130 determines that an association connection between the first of activators 130 and the first of associated monitors 120 has been established, then in step 408, the first of associated monitors 120 resets the timer. In one embodiment, the timer may be reset to a time greater, smaller, or equal to the time-out condition specified in step 402.

If in decision 406 the first of activators 130 determines that an association connection between the first of activators 130 and the first of associated monitors 120 has not been established, then in step 410, the first of activators 130 dissociates from the first of associated monitors 120. For example, in asset management environment 100, monitor 120a and activator 130a may have an RSSI that meets the threshold at a first time. In this instance, activator 130a may be migrated to another location at a later time, resulting in a larger distance between activator 130a and monitor 120a compared to a distance between activator 130a and monitor 120b at the first time. An RSSI between monitor 120a and activator 130a at the later time may fall below the specified threshold, resulting in an association connection that is not successfully established. Accordingly, activator 130a dissociates from monitor 120a and association information is updated by updating respective frames.

FIG. 5 is a diagram of an association request (AR) Frame, in accordance with another embodiment of the present invention. In one embodiment, the AR Frame is transmitted along with an association request transmitted from one of one or more activators 130 to one of one or more monitors 120. Furthermore, the association request may only be transmitted to one or more activators 130 to a first of one or more monitors 120 if a signal strength between the one or more activators 130 and the first of one or more monitors 120 meets or exceeds a threshold, as described in FIG. 3. In one embodiment, an "activator header" frame header identifies a first of one or more of activators 130 transmitting an association request. A media access control address (MAC address) may be implemented by AR Frame as a unique identifier to identify the first of the one or more of activators 130. In one embodiment, an "owner ID" frame header identifies one of IT asset 132 attached to the first of the one or more activators 130. Stated differently, the "owner ID" frame header identifies an IT asset to be monitored by asset management environment 100. A "reserved" frame header indicates a number of bytes reserved for future use for the AR Frame. In one embodiment, a data payload for the AR Frame is 13 bytes.

FIG. 6 is a diagram of a broadcasting (BC) frame, in accordance with another embodiment of the present invention. In one embodiment, the BC Frame is periodically transmitted by one or more monitors 120 to collector 112, such that collector 112 is updated with association information for each of the one or more activators 130. Furthermore, a MAC address may be implemented by BC Frame as a unique identifier. A "broadcasting header" is a header of monitor broadcast frame. A "confirm flag" frame header indicates that an association status of the one or more monitors 120 has changed, but has not been confirmed by collector 112. An "associated MAC" frame header identifies a first of one or more associated activators 130. An "associated owner ID" frame header identifies an IT asset attached to the first of the one or more associated activators 130. A "reserved" frame header indicates a number of bytes reserved for future use for the BC Frame. In one embodiment, a data payload for the BC Frame is 21 bytes.

FIG. 7 is a diagram of an association updated acknowledgement (AUA) frame, in accordance with an embodiment of the present invention. In one embodiment, the AUA Frame is transmitted from collector 112 to a first of one or more monitors 120 after a connection is established between the first of one or more monitors 120 and a first of one or more activators 130. Furthermore, the AUA Frame is implemented by asset management environment 100 to acknowledge an association status change. For example, collector 112 may analyze a "confirm flag" of a BC Frame. In this instance, responsive to determining that the "confirm flag" is zero (i.e., indicating an associated status of the first of the one or more monitors 120 has changed, but not confirmed by collector 112), collector 112 transmits the AUA Frame to the first of the one or more monitors 120. A "data collector header" is a frame header identifying collector 112. An "associated owner ID" is a frame header identifying one of IT assets 132 attached to a first of one or more activators 130 that recently established a new association with a first of one or more monitors 120. A "reserved" frame header indicates a number of bytes reserved for future use for the AUA Frame. In one embodiment, a data payload for the AUA Frame is 13 bytes.

Figure 8:
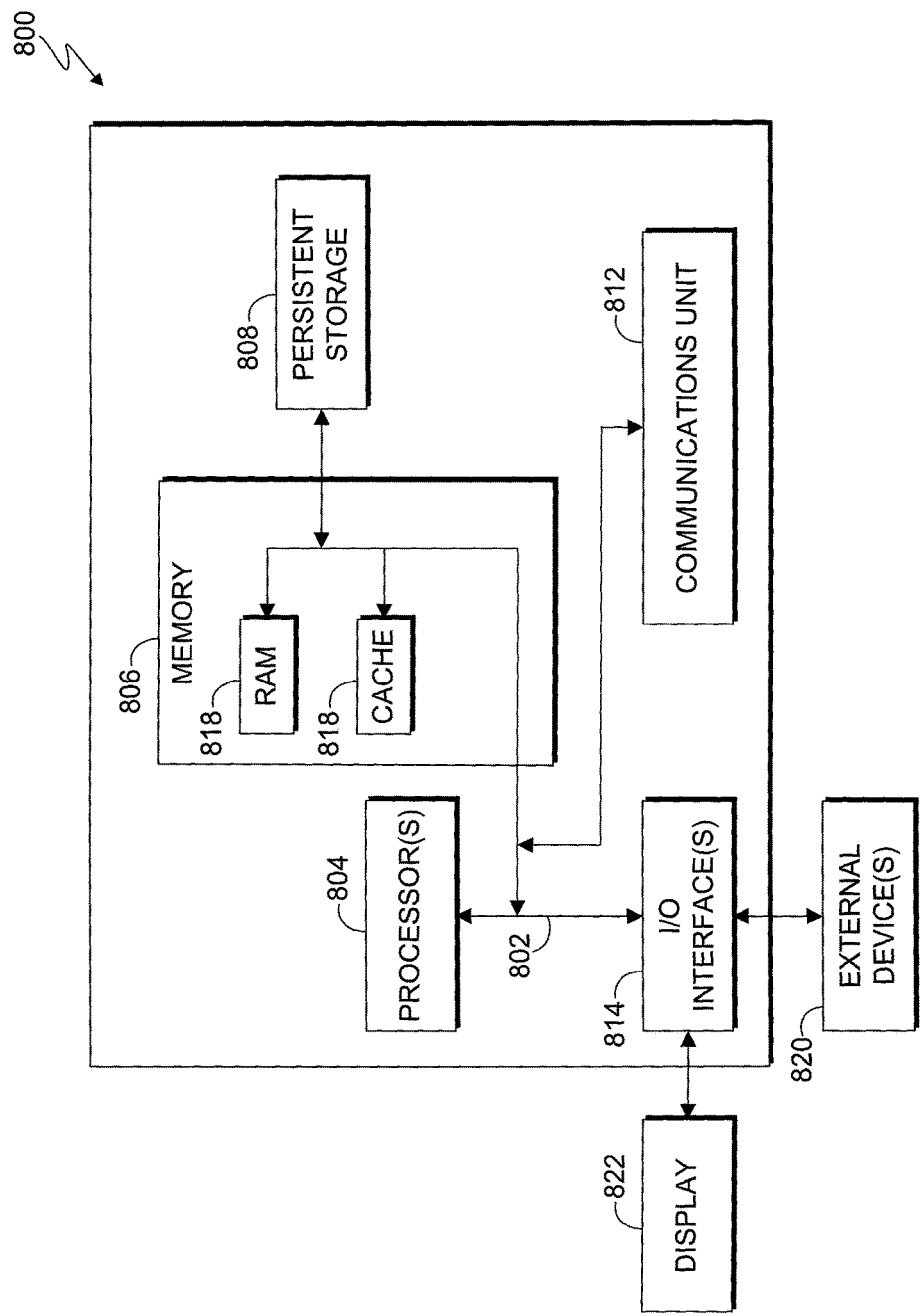
FIG. 8 is a block diagram of internal and external components of the computer systems of FIG. 1, in accordance with an embodiment of the present invention.

FIG. 8 is a block diagram of internal and external components of a computer system 800, which is representative the computer systems of FIG. 1, in accordance with an embodiment of the present invention. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 800 includes communications fabric 802, which provides for communications between one or more processors 804, memory 806, persistent storage 808, communications unit 812, and one or more input/output (I/O) interfaces 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In one embodiment, memory 806 includes random access memory (RAM) 816 and cache memory 818. In general, memory 806 can include any suitable volatile or non-volatile computer-readable storage media. Software is stored in persistent storage 808 for execution and/or access by one or more of the respective processors 804 via one or more memories of memory 806.

Persistent storage 808 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer-readable storage medium that is also part of persistent storage 808.

Communications unit 812 provides for communications with other computer systems or devices via a network. In this exemplary embodiment, communications unit 812 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 812 (e.g., via the Internet, a local area network or other wide area network). From communications unit 812, the software and data can be loaded onto persistent storage 808.

One or more I/O interfaces 814 allow for input and output of data with other devices that may be connected to computer system 800. For example, I/O interface 814 can provide a connection to one or more external devices 820, such as a keyboard, computer mouse, touch screen, virtual keyboard, touch pad, pointing device, or other human interface devices. External devices 820 can also include portable computer-readable storage media such as, for example, thumb drives, portable optical or magnetic disks, and memory cards. I/O interface 814 also connects to display 822.

Display 822 provides a mechanism to display data to a user and can be, for example, a computer monitor. Display 822 can also be an incorporated display and may function as a touch screen, such as a built-in display of a tablet computer.

Figure 9:
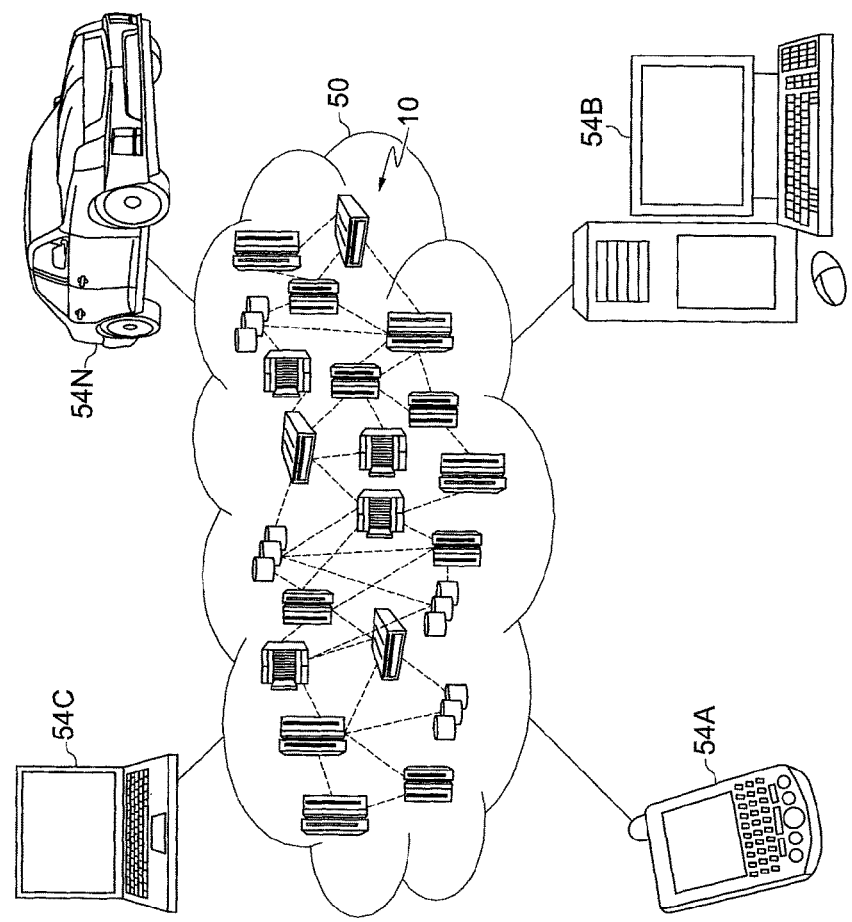
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that cloud computing nodes 10 and cloud computing environment 50 can communicate with any type of computerized device over any type of network and/or network addressable connection (e.g., using a web browser).

Figure 10:
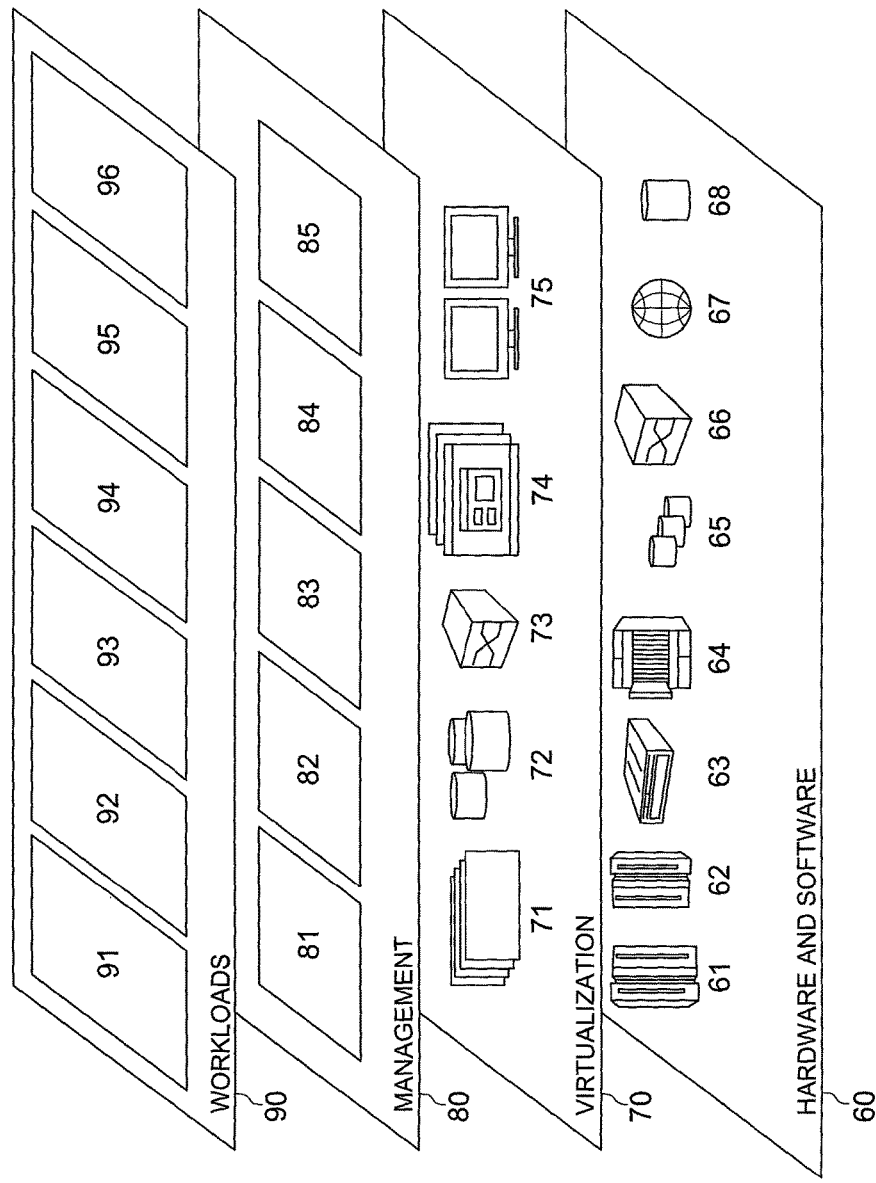
FIG. 10 depicts abstraction model layers, in accordance with an embodiment of the present invention.

Referring now to FIG. 10, a set of functional abstraction layers provided by cloud computing environment 50 (FIG. 9) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asset management system 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in FIGS. 1-10 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in FIGS. 1-12. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in FIGS. 1-10 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in FIGS. 1-10. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

What is claimed is:

1. A computer program product for management of assets in an asset management environment, the computer program product comprising:

one or more computer readable storage media and program instructions stored on the one or more computer readable storage media, the program instructions comprising:

program instructions to, responsive to determining that a received signal strength indicator (RSSI) indicates that a signal power between a first (Bluetooth Low Energy) BLE device and a second BLE device exceeds a predefined threshold, transmit, by the first BLE device, an association request to the second BLE device to establish an association connection between the first BLE device operating in central mode and attached to an asset to track, and the second BLE device operating in peripheral mode and associated with a physical location within an asset management environment, wherein the asset to which the first BLE device is attached is an electronic device including one of: a display monitor, a personal digital assistant (PDA), a mobile cellular device, computing peripheral equipment, another specialized computer system or a computer server;

program instructions to exchange one or more association request frames whereby association information is stored in the second BLE device;

program instructions to establish an association connection between the second BLE device and a third BLE device operating in central mode and coupled to one or more computer processors, and periodically transmit the association information stored in the second BLE device to the third BLE device via one or more broadcasting frames;

program instructions to maintain, by the third BLE device, current association information between the first BLE device and the second BLE device, based on the transmitted association information;

program instructions to receive, by the one or more computer processors from the third BLE device, the current association information between the first BLE device and the second BLE device;

program instructions to identify location information of the asset to which the first BLE device is attached, by the one or more computer processors, based on the current association information between the first BLE device and the second BLE device, an identity of the asset to which the first BLE device is attached, and the physical location of the second BLE device within the asset management environment, wherein the location information of the asset to which the first BLE device is attached describes one or more locations of the asset in asset management environment throughout a duration of time;

program instructions to, responsive to determining that an RSSI does not exceed a predefined threshold, update, by the second BLE device, the association information to indicate that the first BLE device is not associated with the second BLE device; and program instructions to, responsive to determining that the association request frame was not received before a timer time-out condition, dissociate the first BLE device from the second BLE device, wherein the timer time-out condition for the association request frame is implemented to periodically confirm that association connection is currently established.

* * * * *

UNITED STATES PATENT AND TRADEMARK OFFICE
CERTIFICATE OF CORRECTION

PATENT NO. : 9,654,928 B2
APPLICATION NO. : 15/178661
DATED : May 16, 2017
INVENTOR(S) : Mingming Cai et al.

Page 1 of 1

It is certified that error appears in the above-identified patent and that said Letters Patent is hereby corrected as shown below:

On the Title Page

Item (63), should read:
-- (63) Continuation of application No. 15/052,327, filed on Feb. 24, 2016, which is a continuation of application No. 14/861,112, filed on Sep. 22, 2015. --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*